United States Patent
Naudus

Patent Number: 6,105,068
Date of Patent: Aug. 15, 2000

[54] METHOD AND APPARATUS FOR DETERMINING A PROTOCOL TYPE ON A NETWORK CONNECTION USING ERROR DETECTION VALUES STORED WITHIN INTERNETWORKING DEVICES

[75] Inventor: Stanley T. Naudus, Springfield, Va.

[73] Assignee: 3Com Corporation, Santa Clara, Calif.

[21] Appl. No.: 09/021,491

[22] Filed: Feb. 10, 1998

[51] Int. Cl.⁷ .................................................. G06F 15/16
[52] U.S. Cl. ........................ 709/228; 709/236; 714/708
[58] Field of Search ................................. 709/228, 230, 709/231, 236, 227; 714/37, 39, 48, 49, 707, 708, 746, 752, 738, 739, 712, 758, 799, 759

[56] References Cited

U.S. PATENT DOCUMENTS

| | | | |
|---|---|---|---|
| 4,700,340 | 10/1987 | Beranek et al. ............................. | 714/4 |
| 5,526,344 | 6/1996 | Diaz et al. ................................. | 370/364 |
| 5,528,595 | 6/1996 | Walsh et al. . | |
| 5,568,525 | 10/1996 | De Nijs et al. . | |
| 5,577,105 | 11/1996 | Baum et al. . | |
| 5,715,392 | 2/1998 | Ansberry et al. ......................... | 709/228 |
| 5,726,640 | 3/1998 | Jones et al. . | |
| 5,805,822 | 9/1998 | Long et al. ............................... | 709/230 |
| 5,826,017 | 10/1998 | Holzmann ................................. | 709/230 |
| 5,867,494 | 2/1999 | Krishnaswamy et al. ............... | 370/352 |

*Primary Examiner*—Mark H. Rinehart
*Assistant Examiner*—Marc D. Thompson
*Attorney, Agent, or Firm*—McDonnell Boehnen Hulbert & Berghoff; Stephen Lesavich

[57] ABSTRACT

A method and apparatus for determining a network protocol type as the protocol is received on a network connection is presented. A network protocol being used on a communication link is determined by receiving N-number of data frames over the communication link, where N is a small number (e.g., 1 data frame). Error detection codes are calculated on the N-number of data frames with a selected error detection process. The calculated error detection codes are used to determine the type network protocol being used on the communication link. A protocol stack with multiple network protocol layers used on a communication link can also be determined by identifying individual protocol types in the protocol stack using error detection codes. Identifying a network protocol as it is received reduces the complexity of identifying network protocols and prevents multiple network protocol interpreters from being invoked to determine what network protocol is being used.

21 Claims, 10 Drawing Sheets

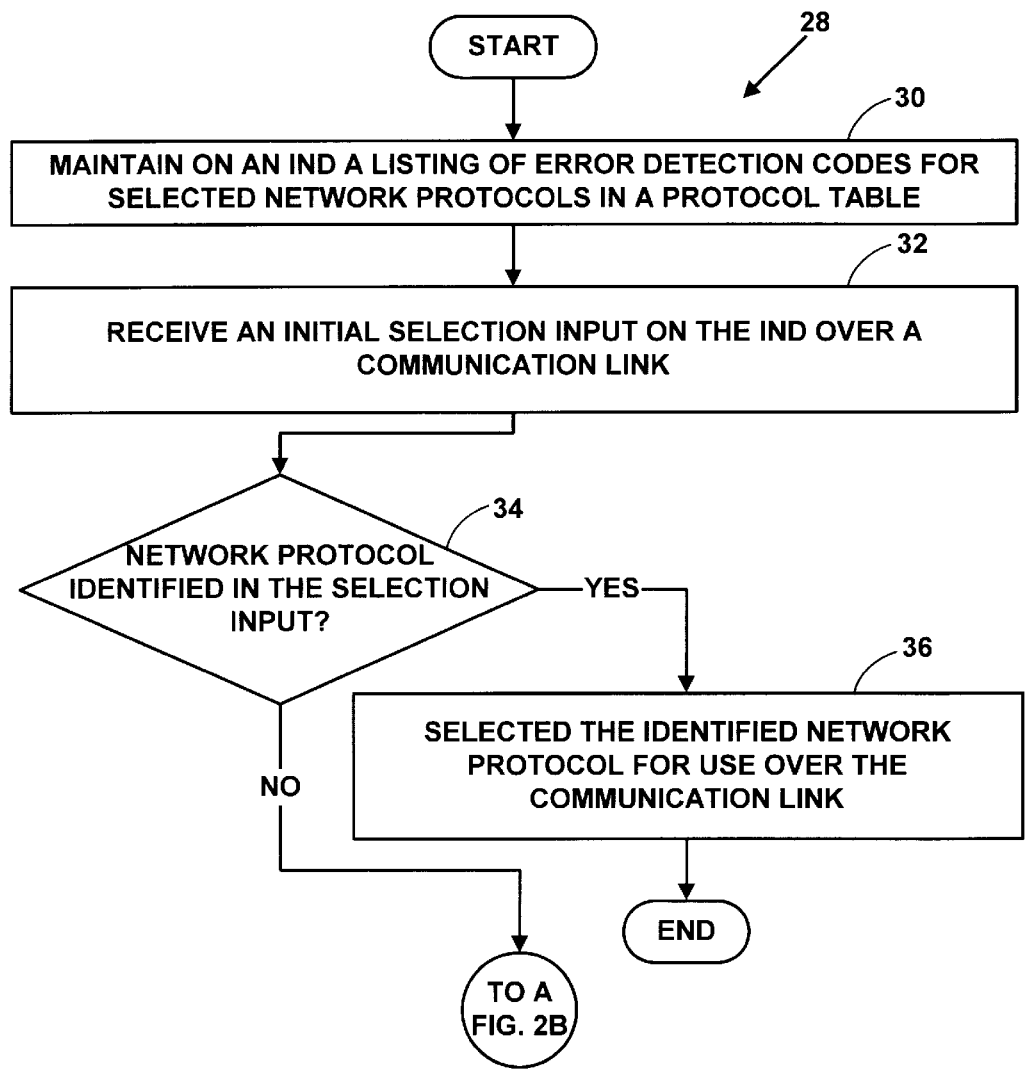

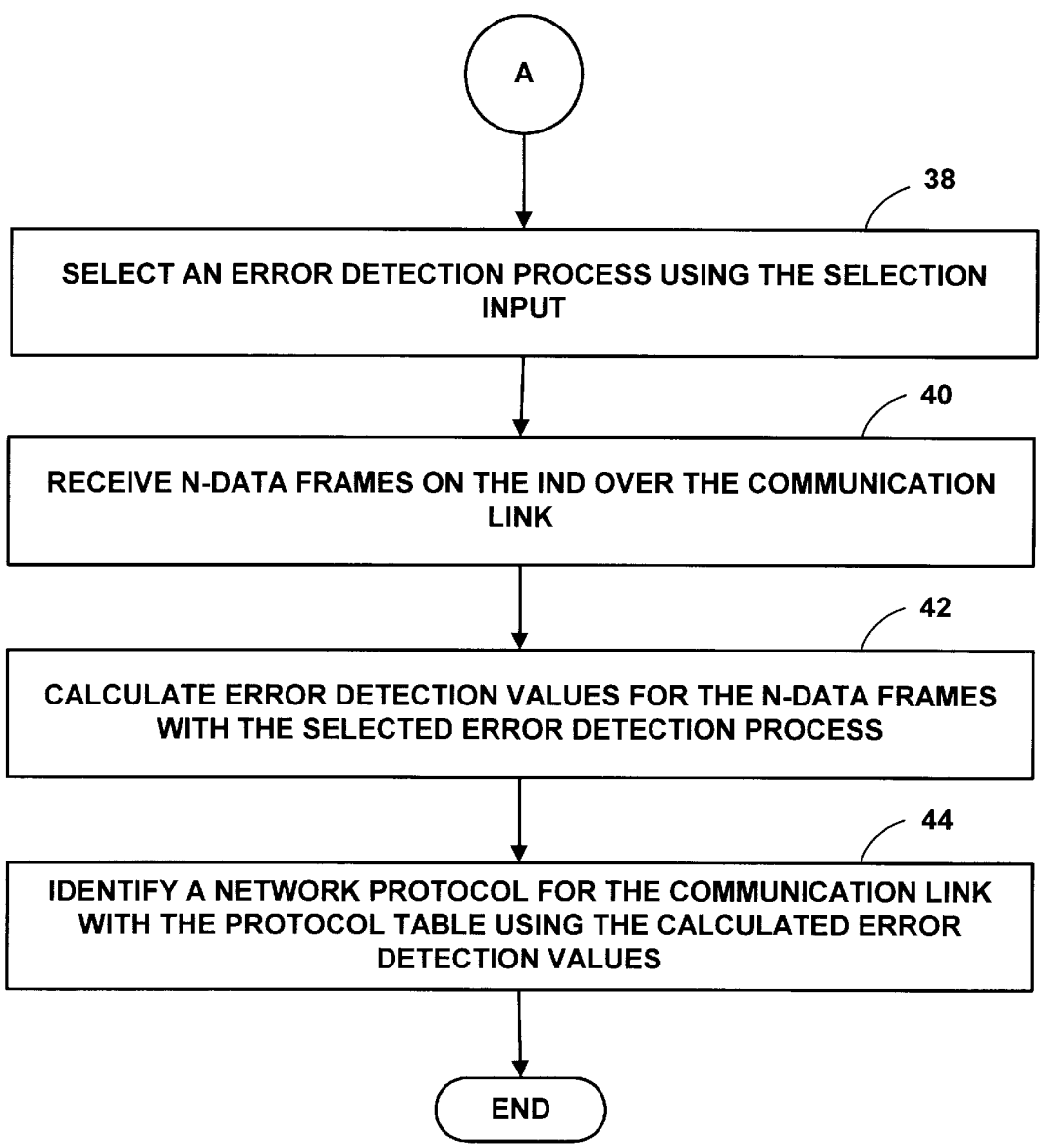

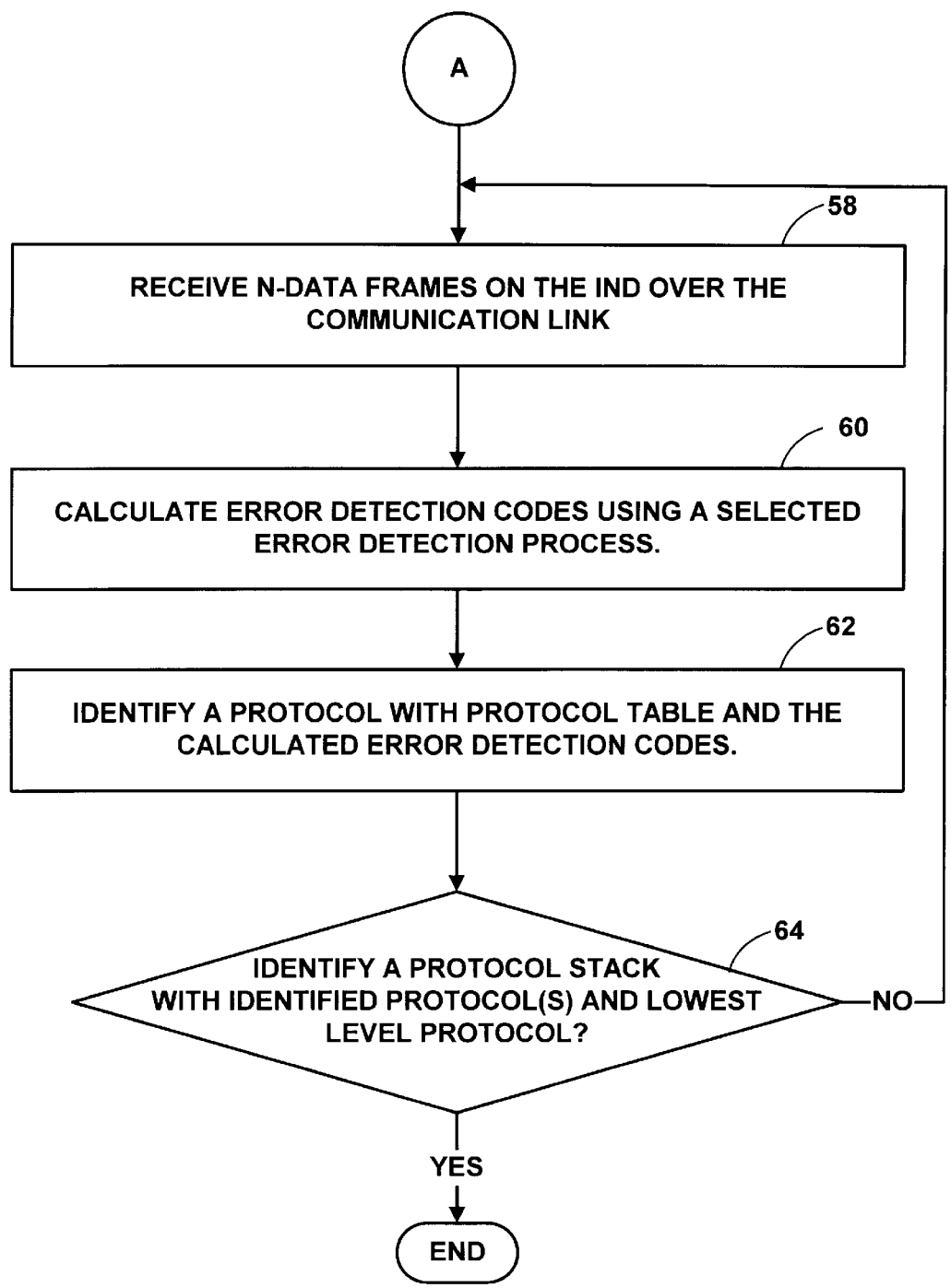

74

76

78

80

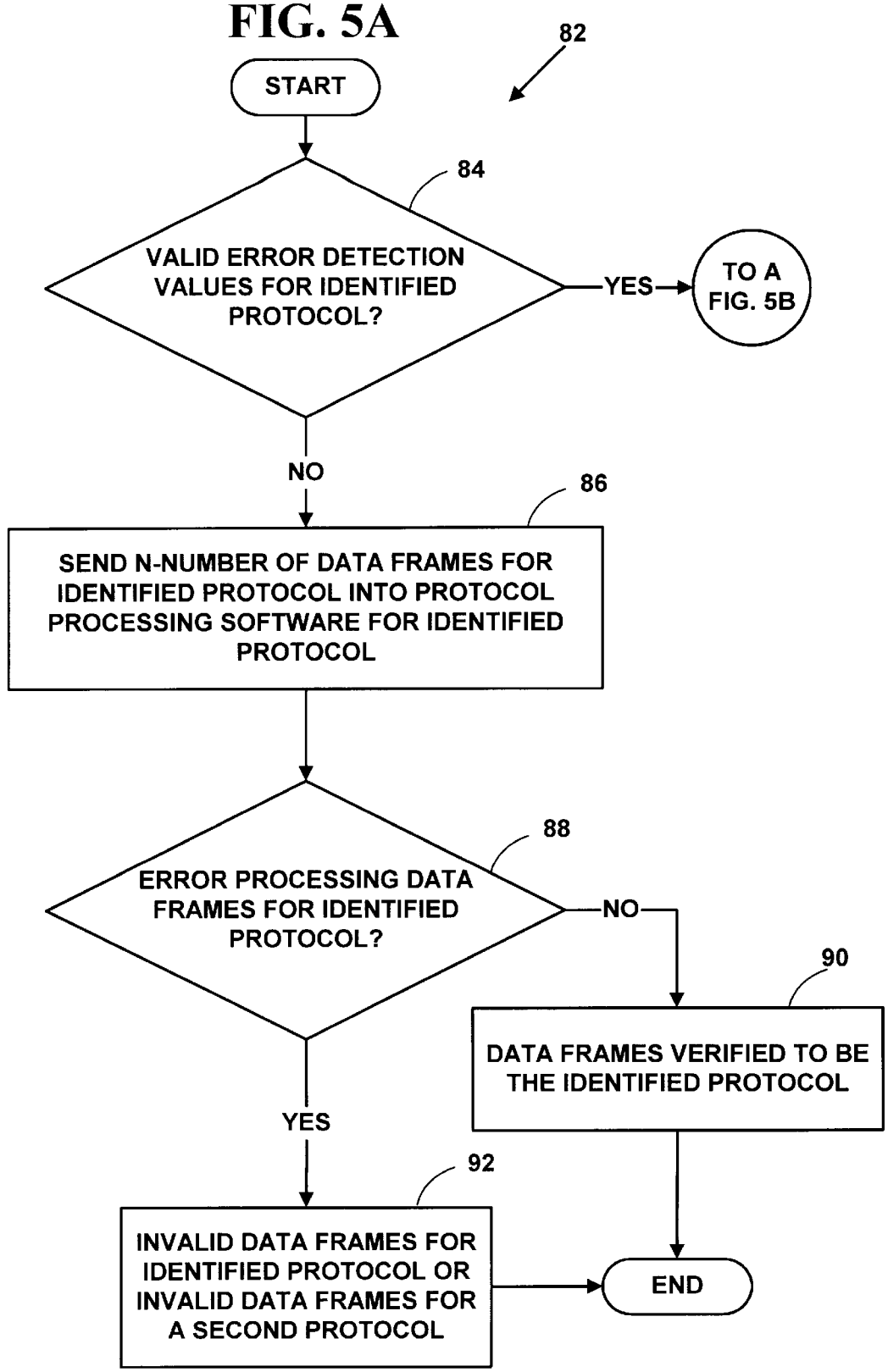

METHOD AND APPARATUS FOR DETERMINING A PROTOCOL TYPE ON A NETWORK CONNECTION USING ERROR DETECTION VALUES STORED WITHIN INTERNETWORKING DEVICES

FIELD OF INVENTION

The present invention relates to computer networks. More specifically, it relates to a method for determining a network protocol being used on a computer network connection.

BACKGROUND OF THE INVENTION

A computer network is a system that connects multiple devices with a multiple types of network connections. The computer network may be a Local Area Network ("LAN") that connects devices over a small geographical area, or a Wide Area Network ("WAN") that connects devices over a large geographical area. The devices in a computer network communicate with network protocols.

Different types of computer networks may be interconnected to each other to form larger computer networks (e.g., the Internet). The interconnections include LAN—LAN, LAN-WAN, WAN—WAN, LAN-WAN-LAN, and other network interconnections.

When computer networks are interconnected, network protocols in use on one network must be translated into network protocols a second network can use. Gateways are typically used to convert one network protocol into another network protocol without loss of information. The functionality of a gateway becomes complex very quickly if a large number of different protocols are used over multiple communication links. The gateway must be able to quickly identify a first network protocol on an incoming link from a first computer network and then translate the network protocol without loss of information and undue delay into a second network protocol on an outgoing link to a second computer network.

There are several problems associated with using gateways to interconnect computer networks using dissimilar network protocols. A gateway is used to determine between multiple network protocols on a communication link. When an input is received on a communication link, the gateway will typically be required to invoke multiple protocol interpreters for protocols expected from multiple computer networks. The protocol interpreters are invoked to identify and use a specific network protocol on the communication link. Invoking multiple protocol interpreters wastes significant amounts of resources on the gateway.

Another problem is that a gateway may invoke multiple protocol interpreters to look for a specific network protocol on multiple channels on a communication link. This also wastes significant resources on the gateway, especially if the gateway has a large number of communication links. The overall cost of invoking multiple protocol interpreters in the gateway dramatically increases if the gateway is connected to multiple communication links of differing types that also use multiple channels.

Yet another problem is that selected network protocols look very similar to other network protocols during the initial negotiation sequence. For example, two protocols may have similar data layouts except one uses error detection codes in its protocol data and the other one does not. This similarity often requires a gateway invoke multiple protocol interpreters to determine which protocol is actually being used. This wastes significant resources on the gateway.

SUMMARY OF THE INVENTION

In accordance with preferred embodiments of the present invention, some of the problems associated with identifying a network protocol on communication link in a gateway or other network device are overcome. A method and apparatus for determining a protocol type on communication link as it is received is presented. Two or more computer networks are interconnected with an internetworking device (e.g., a gateway). The internetworking device has multiple communication links to the computer networks that use multiple network protocols.

The method includes maintaining a protocol table on the internetworking device. The protocol table includes a listing of selected network protocols that include error detection codes as part of protocol data. An initial selection input is received on the internetworking device over a communication link. A determination is made if a network protocol for the communication link is identified in the selection input. If so, the identified protocol is used on the communication link.

If the network protocol is not identified in the initial selection input, an error detection process is selected using the initial selection input. N-number of data frames are received over the communication link, where N is a small number (e.g., 1 data frame). Error detection values are calculated for the N-number of data frames using the selected error detection process. A network protocol being used on the communication link is identified using the calculated error detection values and the protocol table. The method allows a network protocol to be identified on a communication link as it is received without invoking multiple protocol interpreters to identify the incoming network protocol. This results in a significant saving of resources on an internetworking device.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIGS. 2A and 2B are a flow diagram illustrating a method for determining a protocol type used on a communication link;

FIGS. 3A, 3B and 3C are a flow diagram illustrating a method for determining a protocol in a network protocol stack used on communication link;

FIGS. 5A and 5B are a flow diagram illustrating a method for validating an identified protocol.

DETAILED DESCRIPTION OF PREFERRED EMBODIMENTS

Figure 1:
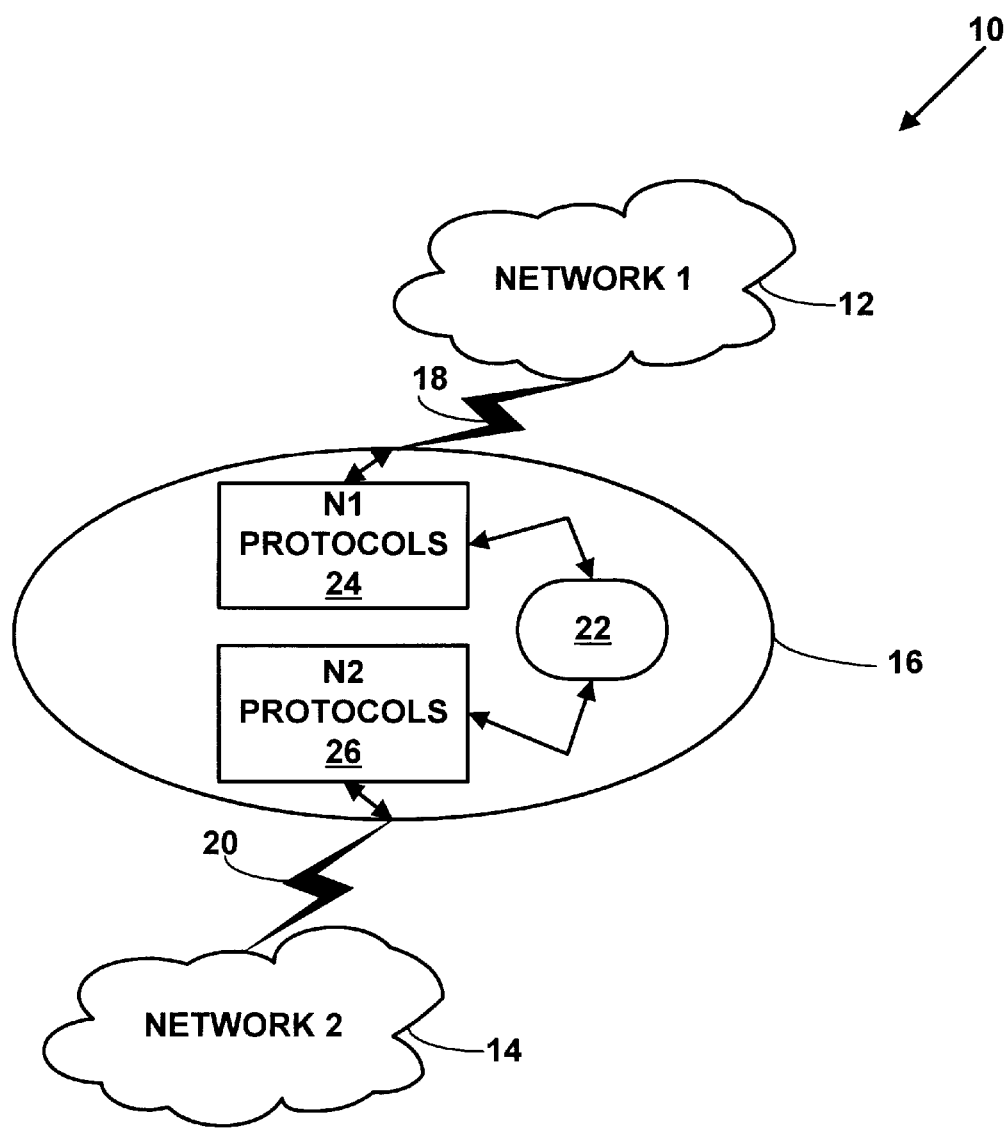
FIG. 1 is a block diagram illustrating a computer network for an illustrative embodiment of the present invention.

FIG. 1 is a block diagram illustrating a computer network 10 for an illustrative embodiment of the present invention. Computer network 10 includes a first computer network 12 and a second computer network 14 interconnected by an InterNetworking Device 16 ("IND"). However, more or fewer computer networks could be interconnected by IND 16 and the invention is not limited to interconnecting two computer networks. In addition, computer network 10 includes additional network devices (i.e., other than IND 16) and additional network nodes which are not shown in FIG. 1. IND 16 is also called an "InterWorking Unit" ("IWU"), an "Intermediate System" ("IS") or a "gateway."

An operating environment for IND 16 of the present invention includes a processing system with at least one high speed Central Processing Unit ("CPU"), in conjunction with a memory system.

The CPU is of familiar design and any of a variety of processors, including those from Digital Equipment, Sun, MIPS, IBM, Motorola, NEC, Intel, Cyrix, AMD, Nexgen and others are equally preferred for CPU. Although described with one CPU, alternatively multiple CPUs may be used.

The memory system includes main memory and secondary storage. The main memory is high-speed random access memory ("RAM") and read only memory ("ROM"). Main memory can include any additional or alternative high-speed memory device or memory circuitry. Secondary storage takes the form of long term storage, such as ROM, optical or magnetic disks, organic memory or any other volatile or non-volatile mass storage system. Those skilled in the art will recognize that the memory system can comprise a variety and/or combination of alternative components.

In accordance with the practices of persons skilled in the art of computer programming, the present invention is described below with reference to acts and symbolic representations of operations that are performed by processing system, unless indicated otherwise. Such acts and operations are referred to as being "computer-executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the processing system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile or non-volatile mass storage system readable by the computer. The computer readable medium includes cooperating or interconnected computer readable media, which exist exclusively on processing system or be distributed among multiple interconnected processing systems that may be local or remote to processing system.

Returning to FIG. 1, IND 16 has multiple communication links 18 to first computer network 12 and multiple communication links 20 to second computer network 14 (illustrated as single connections 18 and 20 in FIG. 1). There may also be multiple communication channels over the communication links (18, 20). IND 16 has a software server 22 with a listing of network protocols 24 for first computer network 12 and a listing of network protocols 26 for second computer network 14. IND 16 uses software server 22 to translate network protocols that arrive on a communication link from one computer network into a protocol for another computer network without undue delay or loss of information.

For example, a first network protocol P1 that arrives over communication link 18 from first computer network 14 is translated with software server 22 into a second network protocol P2 for second computer network 14 using protocol listings 24 and 26. Protocol P2 is sent over communication link 20 to second computer network 14. Thus, first computer network 12 can communicate with second network 14 using IND 16 without having to implement all of the protocols used by second network 14.

FIGS. 2A and 2B are a flow diagram illustrating a method 28 for determining a protocol type on a communication link as it is received in IND 16. As is shown in FIG. 2A, method 28 includes maintaining a protocol table in IND 16 at step 30. The protocol table includes a listing of selected network protocols that include error detection codes as part of their protocol data.

For example, the protocol table may include a listing of selected network protocols that use the Cyclic Redundancy Check ("CRC") error detecting codes known in the data communications arts as part of their protocol data. The protocol table includes a listing of selected network protocols with error detection codes for multiple types of communication links that connect IND 16 to other computer networks.

At step 32, an initial selection input is received on IND 16 over a communication link to establish a communication between two computer networks. The communication may be a voice, video, data or other communication with a desired protocol. The communication link may be connected to any one of the multiple computer networks that have connections to IND 16.

The initial selection input is used at step 34 to determine if a network protocol has been identified. If so, at step 36, the identified network protocol is selected for use by IND 16 on the communication link to the computer network.

If a network protocol has not been identified with the initial selection input at step 34, an error detection process is selected from the protocol table using the selection input at step 38 in FIG. 2B. The error detection process may be selected with the initial selection input using information in the protocol table, by the type of communication being requested on the communication link, or by other methods.

N-number of data frames are received on IND 16 from the computer network over the communication link at step 40. It has been determined experimentally in an illustrative embodiment of the present invention that one data frame is enough to accomplish the invention. However, more data frames could also be received.

Error detection values are calculated for the N-number of data frames using the selected error detection process at step 42. In one embodiment of the present invention, CRC error detection values are calculated on the N-data frames. However, other error detection values could also be calculated (e.g., block sum codes).

As is known in the art, the CRC is an error detecting code. To generate a CRC code for an X-bit block of data, a transmitter generates an Y-bit sequence so that the resulting frame consisting of X+Y bits is exactly divisible by some predetermined number. A receiver then divides the incoming frame by the same number and if there is no remainder for the division, there is no error in the data. If there is remainder in the division, then there is an error in the data. However, a CRC code with a predetermined remainder can also be used. The sender and receiver must agree upon the predetermined remainder in advance. The predetermined number is typically a polynomial code.

Polynomial codes are based upon treating bit strings as representations of polynomials with coefficients of 0 and 1 only. The high-order (leftmost) bit is the coefficient of $x^{k-1}$; the next bit is $x^{k-2}$, etc. Only positions with 1's are counted. For example, the number "1101" includes four bits and thus represents a four term polynomial with coefficients $x^3+x^2+1$. The position for $x^1$ is skipped since a zero is at the $x^1$ position and the $x^0$ position is designated as 1. There are standard CRC polynomial codes known in the art that are used as generator polynomials for the CRC codes. For example, CRC-16 is a 16-bit polynomial code defined as $x^{16}+x^{15}+x^2+1$, and CRC-32 is a 32-bit polynomial defined as $x^{32}+x^{26}+x^{23}+x^{16}+x^{12}+x^{11}+x^{10}+x^8+x^7+x^5+x^4+x^2+x^1+1$.

Returning to FIG. 2B, a network protocol used on the communication link from the computer network is identified with the protocol table using the calculated error detection values at step 44. Protocol processing software is selected for use on the communication link using the identified protocol. The identified protocol is used to establish a communication over the communication link to the computer network that is connected to IND 16.

Computer network 10 (FIG. 1) is used to illustrate an exemplary embodiment of the present invention. An exemplary protocol table maintained on the IND 16 at step 30 (FIG. 2A) is shown in Table 1. However, other protocol table layouts may also be used and the invention is not limited to the protocol table layout, error detection process or contents shown in Table 1. The protocol table is stored in a data structure in a memory or in secondary storage on IND 16.

P1 and P2 are both used for audio/video conferencing. So the selection of an error detection process is accomplished at step 38 with a determination that an audio/video conferencing communication was requested with the initial selection input. As the protocol table indicates, a CRC-32 error detection process is used to determine between audio/video conferencing communication requests from two or more computer networks.

N-number of data frames are received on IND 16 at step 40 and the CRC-32 error detection process is used to calculate CRC-32 values for the data frames at step 42. If the N-number of data frames return remainders of zero using CRC-32, protocol P1 is identified with the protocol table at step 44. If the N-number of data frames return non-zero CRC-32 values, protocol P2 is identified with the protocol table at step 44. Other network protocols are identified in a similar manner using other selection inputs, communication requests and error detection processes.

IND 16 is able to determine with method 28 that the communication link that made the initial selection input is using protocol P1 on communication link 18 from first computer network 12 by receiving N-number of data frames. Protocol processing software for protocol P1 would be selected using the identified P1 protocol. IND 16 translates protocol P1 into protocol P2 (e.g., similar audio/video conferencing functionality) and sends P2 protocol data over communication link 20 to second computer network 14. The

TABLE 1

| Selection Input | Type of Communication | Error Detection Process Used | Error Detection Codes In Protocol Data | Error Detection Values | Protocol |
|---|---|---|---|---|---|
| SI-1 | Audio/video conferencing | CRC-32 | YES | CRC-32 Remainder = 0 | P1 |
| SI-1 | Audio/video conferencing | CRC-32 | NO | CRC-32 Remainder ≠ 0 | P2 |

In one embodiment of the present invention, network protocol information for first and second computer networks (12, 14) connected to IND 16 are stored in a single protocol table (e.g., Table 1). In another embodiment of the present invention, separate protocol tables are used to store information about network protocols for the computer networks (12, 14) connected to IND 16. First computer network 12 desires to communicate with second computer network 14 with an audio/video conference. First computer network 12 uses network protocol P1 over communication link 18 for audio/video conferencing. Second computer network 14 uses network protocol P2 over communication link 20 for audio/video conferencing. IND 16 can identify network protocol P1 or P2 from either first computer network 12 or second computer network 14. IND 16 translates between network protocols P1 and P2.

Returning to FIG. 2A, an initial selection input (e.g., SI-1) is received over a communication link on IND 16 at step 32 to establish a communication from one computer network to another computer network (e.g., 12-to-14 or 14-to-12). A network protocol is not identified in the initial selection input at step 34. At step 38 (FIG. 2B), an error detection process is selected using the selection input. The initial selection input SI-1 indicates an audio/video conferencing communication is desired. As is shown in Table 1, protocols communication link that made the initial selection input may also be using protocol P2 on communication link 20 from second computer network 14. In this case, IND 16 translates protocol P2 into protocol P1 and sends protocol P1 over communication link 18 to first computer network 12.

Method 28 allows a network protocol to be identified on a communication link as it is received on a computer network without invoking multiple protocol identification functionality on IND 16 to identify the network protocol. This saves significant resources on IND 16.

As is known in the art, the Open System Interconnection ("OSI") model is used to describe computer networks. The OSI model consists of seven layers including from lowest-to-highest, a physical, data link, network, transport, session, presentation and application layer. The physical layer transmits bits over a communication link. The data link layer transmits error free frames of data. The network layer provides internetworking, determines routing information and controls a communications subnet. A communications subnet is a collection of transmission media required for routing and data transmission. Most INDs (e.g., gateways) operate at the network level.

Standards organizations such as the International Telecommunications Union-Telecommunication Standardization Sector ("ITU-T", formerly known as the CCITT), the Institute of Electrical and Electronic Engineers ("IEEE"), International Organization for Standards ("ISO") and others establish recommendations for standard network protocols. Devices connected to computer networks such as INDs typically use standard protocols as well as proprietary protocols to communicate with other devices in a computer network. INDs identify both standard and proprietary network protocols.

In one embodiment of the present invention, method 28 is used to identify audio/video conferencing protocols in a multimedia gateway (e.g., IND 16) that are received for audio/video conferencing. However, the invention is not limited to this embodiment, and other embodiments may also be used.

For example, method 28 is used to distinguish between ITU-T H.323 and ITU-T H.324 audio/video conferencing protocols. H.323 is typically sent over the Plain Old Telephone Service ("POTS") lines and H.324 is sent over LANs. Method 28 is also used to distinguish between H.323/LAN and H.323/PPP, or H.323 sent over a LAN (e.g., Ethernet) and H.323 sent over a POTS line with Point-to-Point Protocol ("PPP") discussed below.

IND 16 using method 28, will identify H.323 sent by first computer network 12 over communication link 18, translate H.323 data into H.324, and send it to second computer network 14 over communication link 20. IND 16 could also identify H.324 from second computer network 14 sent over communication link 20, translate H.324 data into H.323 data, and send it to first computer network 12 over communication link 18. First computer network 12 and second computer network 14 would then have a two-way audio/video conferencing communication path.

As is known in the art, ITU-T H.324, entitled "Terminal for Low Bit Rate Multimedia Communication" is the ITU-T recommendation for standard videoconferencing using POTS lines. H.324 uses ITU-T H.223 for its data link layer. H.223 is entitled "Multiplexing Protocol for Low Bitrate Communications." As is known in the art, H.223 frames are variable sized and do not have CRC values at the end of each frame. See the ITU-T H.324 and H.223 standards for more information, incorporated herein by reference.

ITU-T H.323, entitled "Visual Telephone Systems and Terminal Equipment for Local Area Networks That Provide a Non-Guaranteed Quality of Service," is the main family of video conferencing recommendations for Internet Protocol ("IP") networks. H.323 uses H.225, entitled "Media Stream Packetization and Synchronization on Non-Guaranteed Quality of Service LANs" for its data link layer. H.225 frames are variable sized and include a CRC at the end of each frame. See the ITU-T H.323 and H.225 standards for more information, incorporated herein by reference. For example, H.323 and H.324 can be distinguished by comparing data frames from the data link layers since H.223 uses error detection codes and H.225 does not.

Using method 28, at step 30 (FIG. 2A), IND 16 maintains a protocol table such as the exemplary protocol table shown in Table 2 including information about a communication for audio/video conferencing. Table 2 includes information about both H.323 used over communication link 18 by first computer network 12, and H.324 used over communication link 20 by second computer network 14.

TABLE 2

| Selection Input | Type of Communication | Error Detection Process Used | Error Detection Codes In Protocol Data | Error Detection Values | Protocol |
|---|---|---|---|---|---|
| V.8 | Audio/video conferencing | CRC-32 | YES | CRC-32 Remainder = 0 | H.323/H.225 |
| V.8 | Audio/video conferencing | CRC-32 | NO | CRC-32 Remainder ≠ 0 | H.324/H.223 |

At step 32, an initial selection input is received on the IND 16 (i.e., the multimedia gateway) over a communication link. The initial selection input is a V.8 selection input in this example. As is known in the art V.8 is the ITU-T standard specification that covers the procedures for starting sessions of data transmission.

The V.8 selection input is checked to determine if it identifies H.223 in the data link layer of the communication link at step 34. If H.223 is identified in the data link layer, then the H.324 protocol is identified as the incoming protocol from first computer network 12 over communication link 18 at step 36. IND 16 would translate H.324 data into H.323 data and send the data using H.323 out over communication link 20 to second computer network 14.

If H.223 is not identified in the data link layer at step 34, then an error detection process is selected at step 38 (FIG. 2B) using the V.8 input. H.225 includes CRC values, so a CRC error detection process is selected at step 38 (e.g., CRC-32). N-number of data frames are received on IND 16 over communication link 18 from first computer network 14 at step 40.

CRC-32 values are calculated for the N-number of data frames at step 42. At step 44, the network protocol in use is identified using the protocol table and the calculated CRC-32 values.

If the N-number of data frames have zero CRC-32 values (i.e., using calculating a CRC with CRC-32 yields a remainder of zero), then the data link protocol being used is H.225. If the N-number of data frames have non-zero CRC values, the then data link protocol being used is H.223. A data link protocol of H.223, indicates a network protocol of 1.324, while a data link protocol of H.225 indicates a network protocol of H.323. Thus, method 28 is used to determine between two audio/video conferencing protocols (H.323 and H.324) being used over a communication link connected to IND 16 from either first computer network 12 or second computer network 14 with just N-Number of data frames.

Network protocols used on a communication link may also include several layers of different protocol types creating a protocol stack in an OSI network layer (e.g., the data link layer). One or more protocols in the protocol stack may be commonly used for a first application but be inappropriate for a second application. It is desirable to determine what protocols are included in a protocol stack as data is received.

Figure 3A:
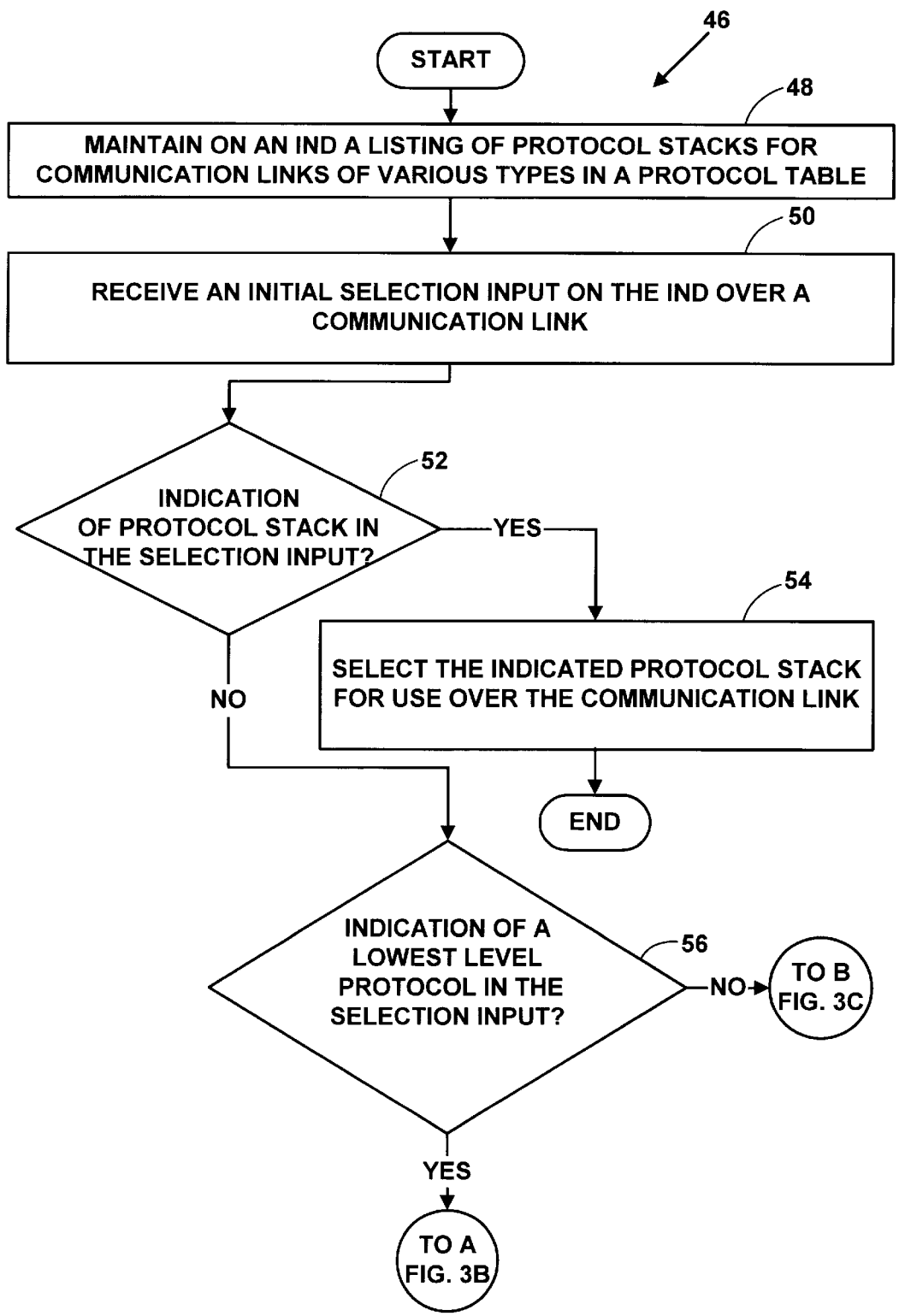
Figure 3C:
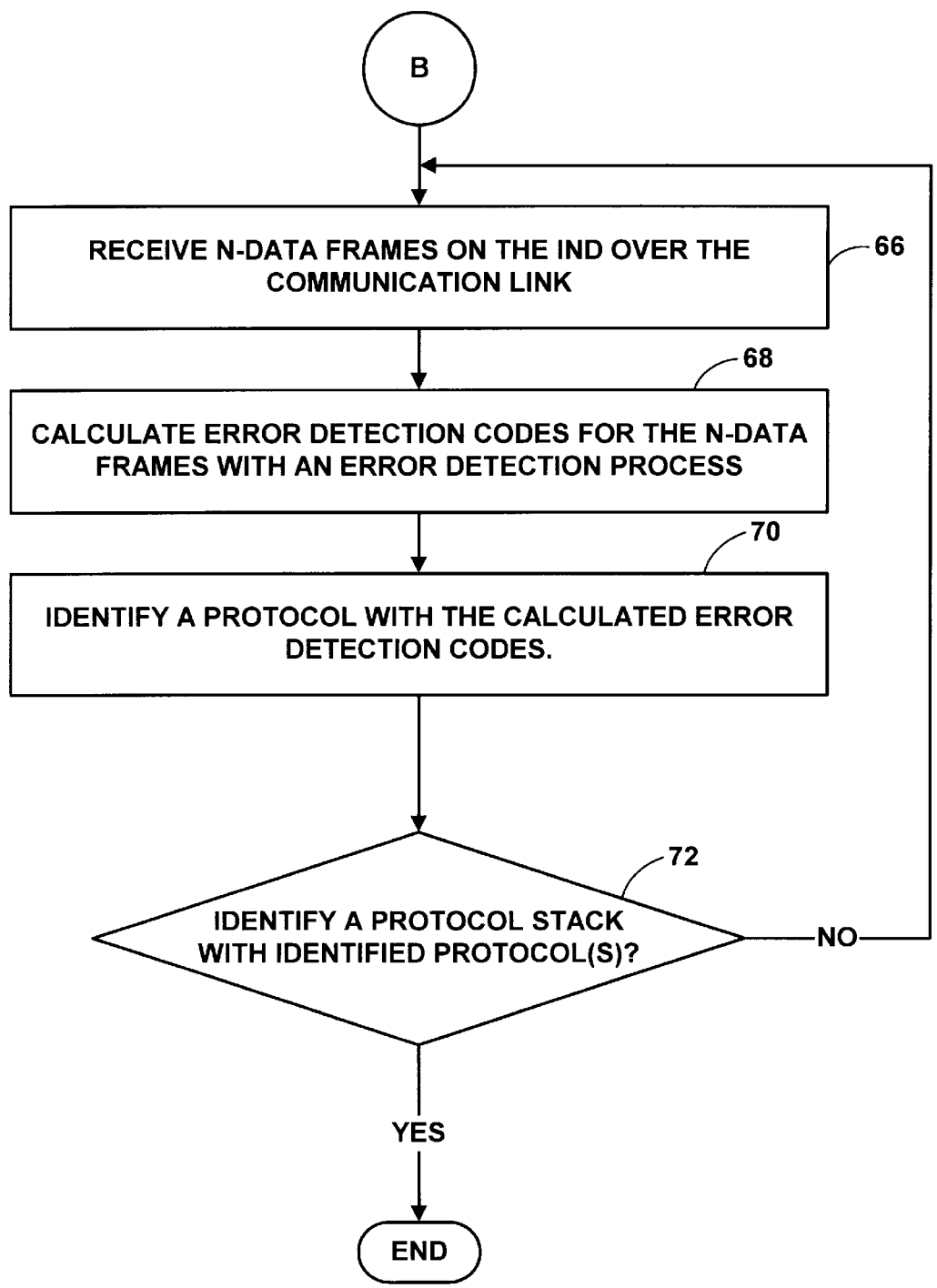

FIGS. 3A, 3B and 3C are a flow diagram illustrating a method 46 for determining protocols in a network protocol stack used over a communication link. Method 46 includes maintaining a list of protocol stacks table that can be expected on communication links (18, 20) on IND 16 at step 48 in FIG. 3A. A protocol stack contains one or more protocols in one or more OSI network layers for a specific type of communication link (see FIGS. 4A, 4B, 4C and 4D). In an illustrative embodiment of the present invention, the list of protocol stacks includes at least one protocol stack that uses a protocol with an error detection code, and a protocol that does not use an error detection code. The error detection codes are generated with a predetermined error detection process (e.g., CRC). However, other types of protocol stacks could also be used, with or without error detection codes.

An initial selection input is received on an IND over a communication link at step 50. The initial selection input is tested at step 52 to determine if it contains an indication of a protocol stack in use on the communication link. If the initial selection input does contain an indication of a protocol stack, then at step 54 the indicated protocol stack is selected for use on the communication link.

If the initial selection input does not contain an indication of a protocol stack at step 52, the initial selection input is tested at step 56 to determine if it contains an indication of a lowest level protocol in a protocol stack in use on the communication link. If the initial selection input contains an indication of a lowest level protocol in a protocol stack at step 56, the remaining protocols in the protocol stack are determined.

At step 58 in FIG. 3B, N-number of data frames are received. At step 60, error detection codes are calculated on the N-number of data frames with a selected error detection process for the protocol stack. As with method 28, the error detection process is selected using the initial selection input and the protocol table.

At step 62, another protocol in the protocol stack is identified with the protocol table using the calculated error detection codes. At step 64, a test is conducted to see if the protocol identified at step 62 can be used with the lowest level protocol to identify a protocol stack being used on the communication link. If not, then steps 58, 60, 62 and 64 are repeated until enough protocols are identified to determine what protocol stack is being used on the communication link.

If the initial selection input does not contain an indication of a protocol stack at step 52 or does not contain an indication of a lowest level protocol in a protocol stack at step 56, then additional data frames must be received to determine what protocols are being used in the protocol stack. At step 66 in FIG. 3C, N-number of data frames are received. At step 68, error detection codes are calculated on the N-number of data frames with an error detection process determined from the initial selection input. At step 70, a protocol is identified with the protocol table and the calculated error detection values. At step 72, a test is conducted to see if the identified protocol can be used to identify a protocol stack in use. If not, then steps 66, 68, 70 and 72 are repeated until enough protocols are identified to determine what protocol stack is being used.

Method 46 is illustrated with another embodiment of the present invention. However, the invention is not limited to this embodiment. As is known in the art, V.42 is a commonly used in the data link layer for modem communications. V.42 is also known as Link Access Procedure for Modems ("LAPM"). V.42 provides error free transmission across modem links. V.42 is often used below other protocols in network applications.

The Point-to-Point Protocol ("PPP") is another protocol used to encapsulate data over a serial communication link such as a serial link connected to a modem. A PPP Packet Data Unit ("PDU") uses HDLC frames in its data link layer is defined by ISO 3309-1979 and 3309-1984, incorporated herein by reference. HDLC frames arc known to those skilled in the data communications arts. PPP also uses Link Control Protocol ("LCP") to establish a data link protocols, and Network Control Protocol ("NCP") for establishing network control protocols in the data link layer. PPP is used below other protocols (e.g., below H.225) in network applications. PPP uses CRC values for LCP and NCP negotiation and authentication. However, PPP does not use CRC values for sending PPP PDUs. See *Internet Engineering Task Force* ("*IETF*") *Internet Request For Comments* ("RFC") 1060 incorporated herein by reference for more information on PPP, incorporated herein by reference.

Figure 4A:
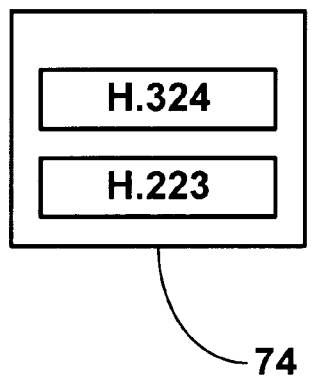
FIGS. 4A, 4B, 4C and 4D are block diagrams illustrating exemplary protocol stacks for lo one embodiment of the present invention.
Figure 4B:
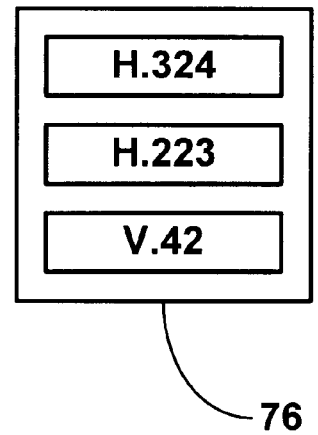
Figure 4C:
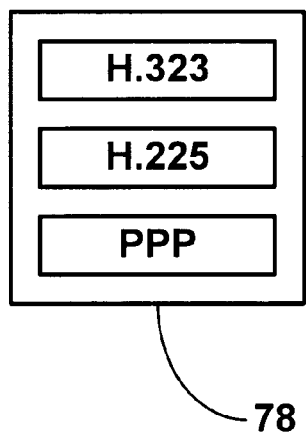
Figure 4D:
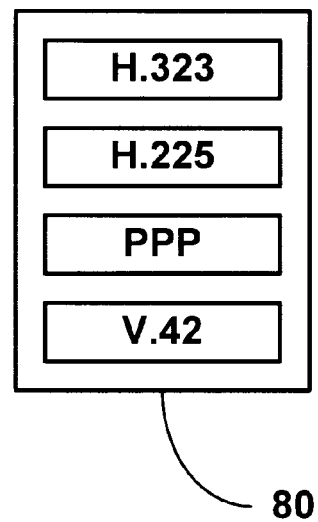

FIGS. 4A–4D are block diagrams illustrating exemplary protocol stacks for a communication links connected to an IND 16. FIG. 4A illustrates a protocol stack 74 for H.324/H.223 without V.42. FIG. 4B illustrates a protocol stack 76 for H.324/H.223 with V.42. FIG. 4C illustrates a protocol stack 78 for H.323/H.225/PPP, without V.42. FIG. 4D illustrates a protocol stack 80 for H.323/H.225/PPP with V.42.

The listing of protocol stacks (74, 76, 78, 80) are maintained in protocol table at step 48 of method 46. As was discussed above, H.225 uses CRC values, H.223 does not use CRC values, and PPP uses CRC values during certain communications (LCP and NCP negotiation and authentication) and not during other communications (sending PPP PDUs).

An initial selection input is received over a communication link on IND 16 at step 50. In this embodiment, the selection input is a V.8 input. At step 52 (FIG. 3A), the V.8 input is tested to determine if it contains an indication of a network protocol that can immediately be used to identify a protocol stack. For example, the V.8 input may indicate that only H.223 was used in the data link layer. As a result, at step 54 protocol stack 74 for H.324/H.223 of FIG. 4A is selected. Protocol stack 78 for H.323/H.225/PPP of FIG. 4B may be selected in a similar manner with a selection input.

If the V.8 input does not contain an indication of a protocol stack at step 54, the initial selection input is tested at step 56 to determine if it contains an indication of a lowest level protocol in a protocol stack. For example, the V.8 input may indicate that V.42 is present as the lowest level protocol in the protocol stack. Thus, protocol stack 76 shown in FIG. 4B for H.324/H.223/V.42 or protocol stack 80 shown in FIG. 4D for H.323/H.225/PPP/V.42 is being used on the communication link.

At step 58 of FIG. 3B, N-number of data frames are received. At step 60, error detection codes are calculated on the N-number of data frames with a selected error detection process. In this embodiment, CRC codes are used as is indicated by the V.8 selection input and the data in the protocol table. A determination is made between H.225, which uses CRC codes, and H.223, which does not use CRC codes using the CRC error detection process. At step 64, a test is conducted to determine if the lowest level protocol (i.e., V.42) and the identified protocol (e.g., H.223 or H.225) can be used to identify a protocol stack (e.g., 76 or 80). If not, steps 58, 60, 62 and 64 are repeated until a protocol stack can be identified.

If the V.8 input does not contain an indication of a protocol stack at step 52, or does not contain an indication of a lowest level protocol in a protocol stack at step 56, then additional data frames must be received at step 66 of FIG. 3C to determine what protocols are being used in the protocol stack. At this point, a determination is being made between the protocol stacks 74 and 78 in FIGS. 4A and 4C respectively.

At step 66, N-number of data frames are received. At step 68, error detection codes are calculated on the N-number of data frames with a selected error detection process. In this example, CRC codes are calculated. As was discussed above, H.225 uses CRC codes while H.223 does not. At step 70, a protocol in the protocol stack is identified using the protocol table and the calculated error detection codes. At step 72, a test is conducted to determine if the identified protocol or protocols can be used to identify a protocol stack. If not, steps 66, 68, 70 and 72 are repeated until a protocol stack is identified with the identified protocols.

In this embodiment, identifying either H.223 or H.225 will identify either protocol stack 74 or 78 respectively if a lowest level protocol link V.42 is not being used. However, the present invention is not limited to the protocol stacks shown in FIGS. 4A–4D or the embodiment just described.

In addition, simpler or more complex protocol stacks with other error detection schemes instead of CRC's could also be used. For example, in another embodiment of the present invention, two additional protocol stacks such as H.323/H.225 or H.323/H.225/V.42 (not illustrated in FIG. 4) might also be used along with those shown in FIGS. 4A–4D. In such an embodiment, method 46 can also be used to determine between two network protocols in a protocol stack that use error detection processes. For example, H.225 uses CRC codes in its protocol data and PPP uses CRC codes for LCP and NCP negotiation and authentication, but not in PPP PDUs. A new error detection process can also be selected at steps 62 and 70 to help make a determination between two network protocols that use error detecting processes (e.g., between H.225 and PPP).

Method 46 can be used to determine if the protocols being used in a protocol stack are appropriate for a selected application. If the protocols are not appropriate for a selected application, a request may be made to stop using a particular protocol.

For example, V.42 is inappropriate for certain applications such as audio/video conferencing. V.42 introduces large delays caused by a large internal buffer and when link errors occur, and uses error correcting procedures that produce significant delay distortion. So the protocol stacks 76 and 80 in FIGS. 4B and 4D would not be appropriate for audio/video conferencing.

As a result, when an audio/video conferencing application on a computer network requests a connection on a communication link, method 46 is used to determine if V.42 is present in the protocol stack being used. If V.42 is being used, the application is asked to discontinue use of V.42 before the connection is made over the communication link. This would prevent the audio/video conferencing from suffering from reduced quality or long delays.

Figure 5B:
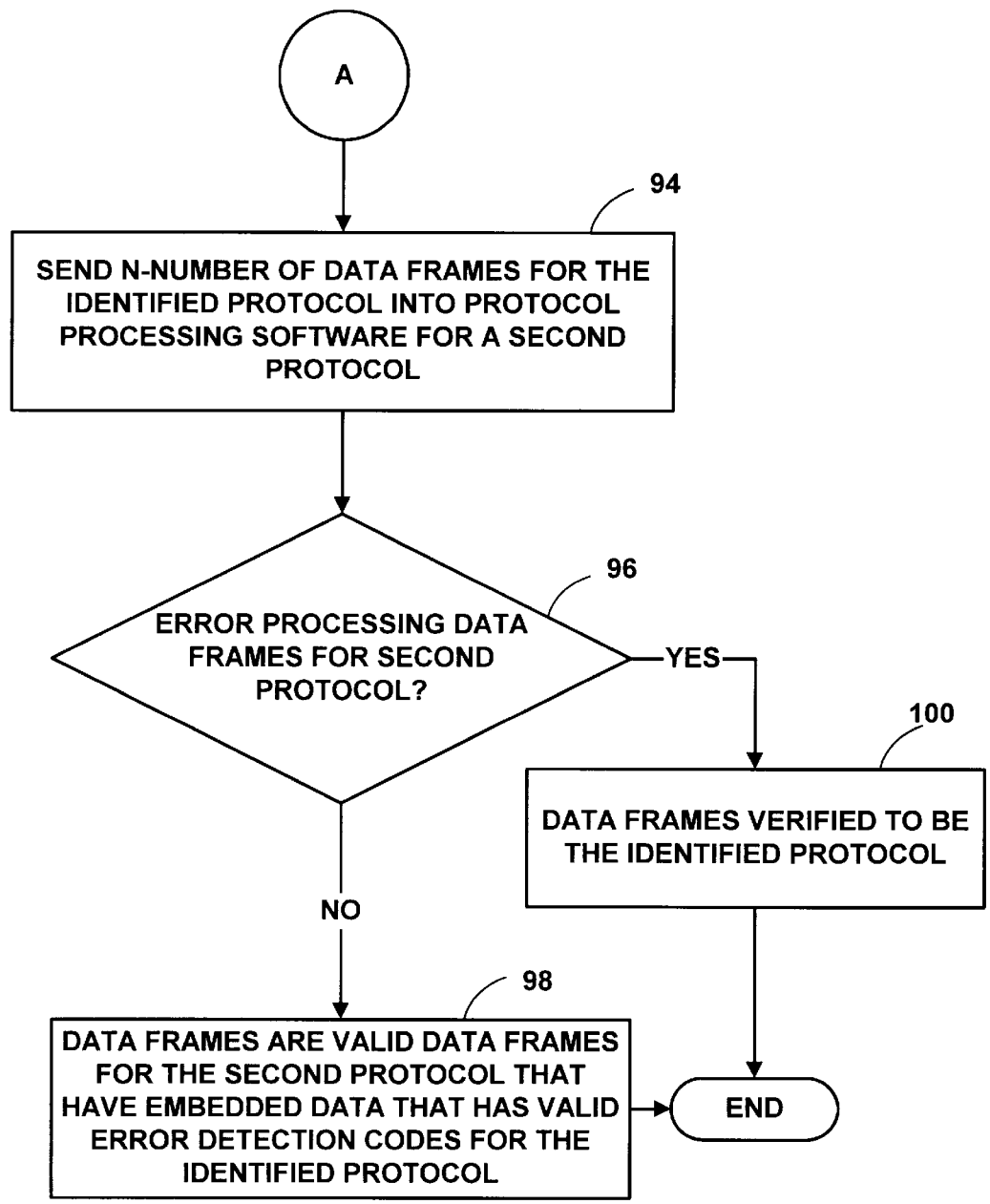

In another embodiment of the present invention, the protocols identified at steps 62 and 70 in method 46 are verified to ensure the identified protocol is actually the protocol being used on the communication link. FIGS. 5A and 5B are a flow diagram illustrating a method 82 of verifying an identified protocol.

At step 84 in FIG. 5A, a test is conducted to determine if the N-number of data frames for an identified protocol have valid error detection values for a selected error detection process used for a second network protocol. If not, at step 86, the N-number of data frames are sent into protocol processing software for the identified protocol which does not use error detection codes in protocol data. The protocol processing software for the identified protocol processes all fields for the protocol in the N-number of data frames to determine their validity.

For one embodiment of the present invention, H.223 is the network protocol identified with method 46 as a result of obtaining calculated non-zero error detection values with the selected CRC error detection process used for H.225. The N-number of H.223 data frames received are sent into H.223 processing software at step 86 of method 82.

At step 88, a test is conducted to determine if any errors occurred processing the N-number of data frames with the protocol processing software for the identified network protocol. If no error occurred at step 88, then at step 90 the data frames are verified to be the identified protocol. If errors occurred at step 88, then the N-data frames are invalid data frames for the identified protocol. The N-data frames may also be a second protocol that uses error detection codes in protocol data. However, the second protocol which uses error detection codes would have transmission errors and not produce valid error detection values with the selected error detection process (i.e., it would have data errors).

In this embodiment, the H.223 processing software would process the H.223 data frames without any errors so the identified protocol would be verified to be H.223. If errors occurred during the processing the N-number of data frames could be invalid H.223 frames or H.225 frames with data errors so valid CRC would not be calculated.

If the N-number of data frames have valid error detection values for a selected error detection process at step 84, then at step 94 of FIG. 5B the N-number of protocol frames are sent into protocol processing software for a second protocol. In this embodiment, the data frames which where thought to be H.225 are sent into H.223 processing software. A test is conducted at step 96 to determine if any errors occurred processing the N-number of data frames using the second protocol processing software. If no errors occurred at step 96, then at step 98 the data frames received are actually valid data frames for the second protocol that just happen to have embedded data indicating valid error detection codes for the identified protocol.

In this embodiment, if the test at step 96 indicates that no errors have occurred during the processing of the N-data frames, the data frames are actually valid H.223 frames with embedded data that produces valid H.225 CRC values when processed with the CRC error detection process used for H.225. There is a very small probability that N-number of H.223 frames will have protocol data that produces valid H.225 CRC values. However, it is still possible such a scenario could occur and method 82 is used to identify such scenarios.

If the test step 96 determines that errors have occurred during the processing of the N-data frames with the second protocol processing software, then the N-number of data frames are actually valid data frames for the identified protocol at step. Method 82 is used to verify a protocol that does not use error detection codes in protocol data with a protocol that does use error detection codes in protocol data (e.g., H.223 is verified with H.225). Method 82 also is used to verify a protocol that does use error detection codes in protocol data with a protocol that does not error detection codes in protocol data (e.g., H.225 is verified with H.223).

Method 28 (FIGS. 2A–2B), method 46 (FIGS. 3A–3C) and method 82 (FIGS. 5A–5B) are implemented as computer software instructions in an application program in a memory of IND 16 (FIG. 1). Methods 28, 46 and 82 are implemented in the C/C++ programming languages.

However, other programming languages could also be used.

Figure 6:
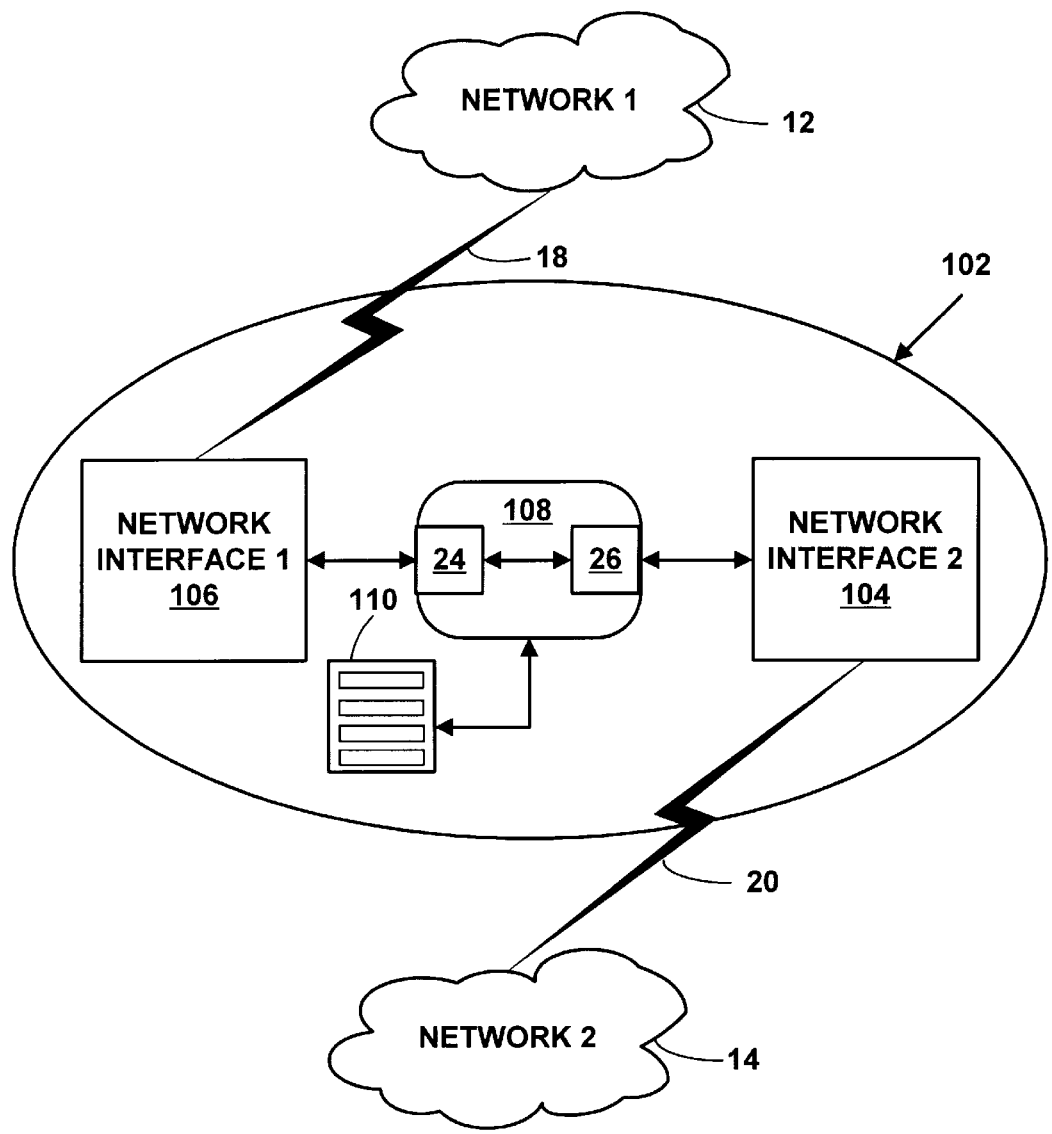
FIG. 6 is a block diagram for an apparatus for an illustrative embodiment of the present invention.

FIG. 6 is a block diagram for an apparatus 102 for an illustrative embodiment of the present invention. Apparatus 102 is used as IND 16 in computer network 10. Apparatus 102 comprises a processing system with multiple network connection interfaces (104, 106) two of which are illustrated in FIG. 6. However, the invention is not limited to two network interfaces, and more or fewer interfaces could also be used. Network connection interfaces (104, 106) are connected over multiple communication links (18, 20) to other computer networks (12, 14) or other network nodes (not shown in FIG. 6). Communication links (18, 20) use multiple network protocols or stacks to communicate with computer networks (12, 14) and may also use multiple communication channels.

Methods 28, 46 and 82 are implemented in a computer software server 108 in a memory for apparatus 102. Computer software server 108 has a protocol table 110 listing error detection codes for selected network protocols or a listing of protocol stacks used on communication links (18, 20). Protocol table 110 may be a data stricture in main memory or secondary storage. Computer software server 108 uses methods 28, 46, and 82 to determine a network protocol or a protocol stack being used on a communication link (18, 20) as it is received.

In one specific embodiment of the present invention, apparatus 102 used as IND 16 is implemented in a "Total Control Telephony Chassis" by U.S. Robotics Corporation, of Skokie, Ill. The Total Control Telephony Chassis includes multiple network interface cards connected by a common bus. See "Modem Input/Output Processing Techniques", U.S. Pat. No. 5,528,595, granted to Dale M. Walsh et al., incorporated herein by reference, for more information on the U.S. Robotics Telephony Chassis. Interfaces 104 and 106 are any network interfaces by U.S. Robotics or others that have network connection capabilities. For example, interface 104 and 106 can be a U.S. Robotics T1 interface card, a U.S. Robotics LAN interface card, or U.S. Robotics Quad Modem card. Computer software server 108 is added to existing software in the Total Control Telephony Chassis to implement methods 28, 46, and 82 described above to accomplish the present invention. However, apparatus 102 can also be implemented in other devices with other hardware and software configurations and is not limited to implementation in a U.S. Robotics Total Control Chassis.

The present invention offer several advantages of the prior art. It can determine a network protocol or a network protocol stack being used on a communication link as the network protocol or protocol stack is received. This prevents multiple protocol interpreters from being started to identify the network protocol or network protocol stack being used saving significant resources on the network node. Individual network protocols can be identified by receiving a small number of data frames and applying an error detection process to the data frames. This also saves resources on an internetworking device.

It should be understood that the programs, processes, methods and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. In an internetworking device connecting a first computer network to a second computer network with a plurality of communication links, the plurality of communication links using a plurality of network protocols for communications, a method of determining a network protocol being used over a communication link, the method comprising the following steps:

maintaining a protocol table on the internetworking device, the protocol table having a listing of error detection codes to identify selected ones of the plurality of network protocols wherein the error detection codes are generated by a predetermined error detection process;

receiving an initial selection input on the internetworking device over a communication link, wherein the initial selection input includes a desired type of communication to be used on the communication link;

selecting an error detection process using the selection input, wherein the error detection process is used to identify a network protocol being used on the communication link;

receiving N-number of data frames over the communication link with a data-link protocol associated with a network protocol;

calculating with the selected error detection process, error detection values for the N-number of data frames; and identifying a network protocol being used on the communication link using the calculated error detection values for the data-link protocol data frames and the protocol table.

2. A computer readable medium having stored therein instructions for causing a central processing unit in the internetworking device to execute the method of claim 1.

3. The method of claim 1 further comprising:

selecting protocol processing software for the identified network protocol on the internetworking device for use on the communication link.

4. The method of claim 1 further comprising:

determining whether a network protocol has been identified with the initial selection input, and if so, selecting protocol processing software for the identified network protocol on the internetworking device for use on the communication link.

5. The method of claim 1 further comprising:
verifying the network protocol being used on the communication link is the identified network protocol.

6. The method of claim 1 wherein the step of identifying a network protocol being used on the communication link includes identifying a network protocol from the protocol table which does not have a error detection code for selected error detection process.

7. The method of claim 1 wherein the step of identifying a network protocol being used on the communication link includes identifying any of H.323 or H.324 network protocols with N-number of H.225 or H.223 data frames received.

8. The method of claim 1 wherein the step of receiving N-number of data frames includes receiving one data frame.

9. In an internetworking device connecting a first computer network to a second computer network with a plurality of communication links, the plurality of communication links using a plurality of protocol stacks for communications, a method of determining a type of network protocol stack being used over a communication link, the method comprising the following steps:
maintaining a protocol table on the internetworking device, the protocol table including selected ones of the protocol stacks having one or more network protocols with error detection codes, and one or more of the network protocols without error detection codes;
receiving an initial selection input on the internetworking device over a communication link, wherein the initial selection input includes a desired type of communication to be used on the communication link;
receiving N-number of data frames over the communication link with a data-link protocol associated with a network protocol;
calculating with a selected error detection process, error detection values for the N-number of data frames;
identifying one or more network protocols being used on the communication link using the calculated error detection values for the data-link protocol data frames and the protocol table; and
identifying a protocol stack being used on the communication link with the one or more identified network protocols.

10. A computer readable medium having stored therein instructions for causing a central processing unit in the internetworking device to execute the method of claim 9.

11. The method of claim 9 further comprising:
determining with the initial selection input whether a network protocol stack for the communication link has been identified, and if so,
selecting the identified protocol stack for use on the communication link.

12. The method of claim 9 further comprising:
determining with the initial selection input whether a lowest level network protocol in the protocol stack has been identified, and if so,
receiving N-number of data frames over the communication link with a data-link protocol associated with a network protocol;
calculating with a selected error detection process, error detection values for the N-number of data frames;
identifying one or more network protocols being used on the communication link with the protocol table using the calculated error detection values for the data-link protocol data frames; and
identifying a protocol stack being used on the communication link with the lowest level protocols and the one or more identified network protocols.

13. The method of claim 9 wherein the step of receiving identifying a protocol stack being used includes identifying any of H.324/H.223, H.324/H.223/V.42, H.323/H.225, H323/H.225/PPP, H.323/H.225/PPP/V.42 or H.323/LAN protocol stacks.

14. In an internetworking device connecting a first computer network to a second computer network with a plurality of communication links, the plurality of communication links using a plurality of network protocols for communications, a method of verifying a network protocol being used on a communication link, the method comprising the following steps:
identifying a first network protocol which uses error detection codes in protocol data by receiving N-number of data frames on the communication link and calculating valid error detection values with a selected error detection process used for the first network protocol;
sending the N-number of data frames into protocol processing software for a second network protocol which does use error detection codes in protocol data; and
determining whether an error occurred during processing of the N-number of data frames in the protocol processing software for the second network protocol, and if not,
identifying the N-number of data frames as data frames for the second network protocol having protocol data including valid error detection values for the first network protocol.

15. A computer readable medium having stored therein instructions for causing a central processing unit in the internetworking device to execute the method of claim 14.

16. The method of claim 14 further comprising:
sending the N-number of data frames into protocol processing software for the first network protocol;
determining whether an error occurred during processing of the N-number of data frames in the protocol processing software for the second network protocol, and if not,
verifying the N-number of data frames are from the first network protocol.

17. An internetworking apparatus, the apparatus comprising:
a protocol identifier, for identifying a network protocol being used on a communication link with error detection values calculated for N-number of data frames received over the communication link;
a protocol verifier, for verifying an identified network protocol;
a protocol listener, for maintaining a listing of error detection codes for selected network protocols used for multiple type of communication links; and
a protocol stack listener, for maintaining a listing of protocol stacks used for multiple types of communication links;
a lower level protocol identifier, for identifying a lowest level network protocol in a protocol stack;
a higher level protocol identifier, for identifying one or more protocols above the lowest level network protocol in the protocol stack link with error detection values calculated for N-number of data frames received over the communication link; and a protocol stack identifier, for identifying the protocol stack in use on the communication link with the lowest level network protocol and the identified network protocols.

18. In an internetworking device connecting a first computer network to a second computer network with a plurality of communication links, the plurality of communication links using H.323 or H.324 network protocols for communications, wherein H.225 data link protocol is used to identify H.323 network protocol and H.223 data link protocol is used to identify H.324 network protocol, a method of determining a network protocol being used over a communication link, the method comprising the following steps:

maintaining a protocol table on the internetworking device, the protocol table having a listing of error detection codes for H.225 protocol;

receiving an initial selection input on the internetworking device over a communication link;

selecting an error detection process for H.225 using the selection input;

receiving N-number of data link frames over the communication link;

calculating with the selected error detection process, error detection values for the N-number of data link frames;

identifying the H.225 data link protocol or the H.223 data link protocol using the calculated error detection values and the protocol table; and identifying the H.323 or H.324 network protocol using the identified data link protocol.

19. A computer readable medium having stored therein instructions for causing a central processing unit in the internetworking device to execute the method of claim 18.

20. The method of claim 1 wherein the desired type of communication to be used on the communication link includes an audio or video conference.

21. The method of claim 1 wherein the first selection input includes a V.8 protocol selection input.

* * * * *